(12) United States Patent
Bulling

(10) Patent No.: US 12,233,678 B2
(45) Date of Patent: Feb. 25, 2025

(54) DEVICE AND METHOD FOR ADJUSTING A BASE OF A SPRING ELEMENT FOR A VEHICLE

(71) Applicant: Vibracoustic SE, Darmstadt (DE)

(72) Inventor: Dieter Bulling, Wedemark (DE)

(73) Assignee: Vibracoustic SE, Darmstadt (DE)

( * ) Notice: Subject to any disclaimer, the term of this patent is extended or adjusted under 35 U.S.C. 154(b) by 258 days.

(21) Appl. No.: 17/630,968

(22) PCT Filed: Jul. 30, 2020

(86) PCT No.: PCT/EP2020/071562
§ 371 (c)(1),
(2) Date: Jan. 28, 2022

(87) PCT Pub. No.: WO2021/019040
PCT Pub. Date: Feb. 4, 2021

(65) Prior Publication Data
US 2022/0266648 A1 Aug. 25, 2022

(30) Foreign Application Priority Data

Jul. 31, 2019 (DE) .................. 10 2019 120 693.6
Aug. 1, 2019 (DE) .................. 10 2019 120 845.9

(51) Int. Cl.
*B60G 17/015* (2006.01)
*B60G 17/016* (2006.01)
(Continued)

(52) U.S. Cl.
CPC ....... *B60G 17/021* (2013.01); *B60G 17/0155* (2013.01); *B60G 17/016* (2013.01);
(Continued)

(58) Field of Classification Search
CPC .............. B60G 17/015; B60G 17/0152; B60G 17/0155; B60G 17/016;
(Continued)

(56) References Cited

U.S. PATENT DOCUMENTS 3,598,422 A    8/1971   Strauff
5,530,648 A *  6/1996   Lavey ................ B60G 17/0161
                                                              701/41
(Continued)

FOREIGN PATENT DOCUMENTS

DE    1136219 B    9/1962
DE    2545082 A1   4/1977
(Continued)

OTHER PUBLICATIONS

JP 2001-206035 English translation (Year: 2001).*
(Continued)

*Primary Examiner* — Erick R Solis
(74) *Attorney, Agent, or Firm* — Fishman Stewart PLLC

(57) ABSTRACT

A device for adjusting a foot point of a vehicle spring element includes a first wall element for connecting to a vehicle, a second wall element spaced from the first wall element and connecting to the spring element, and a chamber disposed between the first wall element and the second wall element for changing the distance between the first wall element and the second wall element by changing a volume of the chamber, the chamber having an incompressible fluid and the first and/or second wall element including a passage opening for the incompressible fluid to the chamber. In embodiments, the passage opening is fluidly connectable to a supply/discharge device for the incompressible fluid, and the chamber has a chamber wall with a third wall element
(Continued)

extending from the first wall element to the second wall element, the mass of which is constant when the volume of the chamber is changed.

16 Claims, 8 Drawing Sheets

(51) Int. Cl.
  *B60G 17/02* (2006.01)
  *B60G 17/027* (2006.01)
  *B60G 17/04* (2006.01)
  *B60G 17/048* (2006.01)
  *B60G 17/052* (2006.01)

(52) U.S. Cl.
  CPC ......... *B60G 17/0272* (2013.01); *B60G 17/04* (2013.01); *B60G 17/0485* (2013.01); *B60G 17/0521* (2013.01); *B60G 17/0525* (2013.01); *B60G 2400/942* (2013.01); *B60G 2400/95* (2013.01)

(58) Field of Classification Search
  CPC .... B60G 17/0161–0165; B60G 17/017; B60G 17/01908; B60G 17/01916; B60G 17/01925; B60G 17/021; B60G 17/0272; B60G 17/0485; B60G 17/0521; B60G 17/0525; B60G 2400/942; B60G 2400/95; B60G 2800/19
  USPC ..................................................... 701/37, 38
  See application file for complete search history.

(56) References Cited

U.S. PATENT DOCUMENTS

| | | | |
|---|---|---|---|
| 6,402,128 B1 * | 6/2002 | Trowbridge ....... | B60G 17/0485 267/64.18 |
| 9,751,374 B2 * | 9/2017 | Izak .................. | B60G 17/0525 |
| 10,118,455 B1 * | 11/2018 | Lambert ............. | B60G 15/063 |
| 2003/0107161 A1 * | 6/2003 | Teichmann ............ | B61F 5/307 267/64.11 |
| 2006/0001315 A1 * | 1/2006 | Stevens ................ | B60G 15/063 303/191 |
| 2013/0221626 A1 * | 8/2013 | Lee ........................ | B60G 17/08 280/5.514 |
| 2014/0367930 A1 | 12/2014 | Zeweke et al. | |
| 2018/0001729 A1 * | 1/2018 | Goffer ............. | B60G 17/01908 |
| 2019/0047345 A1 * | 2/2019 | Dockter ................ | G05D 1/021 |
| 2019/0105957 A1 * | 4/2019 | Belter .................... | B60G 17/00 |
| 2019/0143781 A1 * | 5/2019 | Schatzberger ..... | B60G 17/0272 280/5.513 |
| 2020/0055364 A1 * | 2/2020 | Miletta ............. | B60G 17/0416 |
| 2021/0031815 A1 * | 2/2021 | Muhr ........................ | B61F 5/22 |
| 2021/0237530 A1 * | 8/2021 | Rajan .................... | F16C 19/163 |

FOREIGN PATENT DOCUMENTS

| | | |
|---|---|---|
| DE | 4026790 C1 | 10/1991 |
| DE | 4103670 A1 | 8/1992 |
| DE | 19508980 C1 | 6/1996 |
| DE | 102008009795 A1 | 8/2009 |
| DE | 102009031074 A1 | 1/2011 |
| DE | 102012010485 A1 | 4/2013 |
| DE | 102014108241 A1 | 12/2014 |
| JP | 86056616 A | 4/1985 |
| JP | 2001206035 A | 7/2001 |
| JP | 201121936 A | 2/2011 |

OTHER PUBLICATIONS

Extended European Search Report for Application No. 23174767.6-1009 dated Jul. 26, 2023 with translation (20 pages) Jul. 26, 2023.
International Search Report, PCT/EP2020/071562, dated Sep. 30, 2020, with Translation.
Chinese Office Action and Search Report dated May 28, 2024, Chinese App. No. 202080054353.3 (w_translation).

* cited by examiner

DEVICE AND METHOD FOR ADJUSTING A BASE OF A SPRING ELEMENT FOR A VEHICLE

CROSS-REFERENCE TO RELATED APPLICATIONS

This application is a National Stage Patent Application of International Patent Application No. PCT/EP2020/071562, filed Jul. 30, 2020, which claims the benefit of German Application Serial No. DE 10 2019 120 693.6, filed Jul. 31, 2019, and German Application Serial No. DE 10 2019 120 845.9, filed Aug. 1, 2019, the contents of each are incorporated by reference in their entireties.

TECHNICAL FIELD

The invention relates to a device for adjusting a foot point of a spring element for a vehicle, a system comprising the device, and a method for adjusting a foot point of a spring element for a vehicle.

BACKGROUND

In vehicles, the vehicle chassis is connected to the wheel suspensions via vehicle springs. This serves to drive the wheels away from the vehicle chassis during travel following impacts that move the wheels and the wheel suspension in the direction of the vehicle bodies. Depending on the load condition of the vehicle, the vehicle springs are compressed to varying degrees. This also changes the distance between the wheels or wheel suspension and the vehicle chassis. Some mobility concepts, especially those of the future, require that the vehicle level can be kept constant or selectively adjusted under different loading conditions. For example, optimized positioning relative to the airstream is required for cooling and for optimum ground clearance in electrically powered vehicles. For this purpose, level controls are used to adjust the position of a base point of the vehicle springs.

From U.S. Pat. No. 3,598,422, for example, describes hydraulic foot point displacement devices for a vehicle suspension spring at the body or wheel end connection via hydraulic cylinders with the same seal. However, sliding seals are complex, expensive to manufacture and vulnerable with regard to the seal. The friction occurring in the seal increases the power requirement during adjustment. Particularly in the case of free-standing springs without integrated shock absorbers, a linear guide function must be implemented in the hydraulic cylinder, which requires an additional overall height.

It can therefore be regarded as a task of the invention to provide a device for adjusting a foot point of a spring element for a vehicle which is simple in design, inexpensive and has a high control speed for vehicle dynamics control.

Features and embodiments of the invention are disclosed herein.

SUMMARY

In an apparatus for adjusting a foot point of a spring element for a vehicle, the apparatus comprising a first wall element for connection to a vehicle, a second wall element spaced from the first wall element for connection to the spring element, and a chamber disposed between the first wall element and the second wall element for changing the distance between the first wall element and the second wall element by changing a volume of the chamber, wherein the chamber has an incompressible fluid and the first and/or second wall element comprises a passage opening for the incompressible fluid to the chamber, which passage opening is connectable in fluid communication with an input/output device for the incompressible fluid for changing the volume of the chamber, wherein according to the invention it is provided that the chamber has a chamber wall with at least one third wall element extending from the first wall element to the second wall element, the mass of which third wall element is constant when the volume of the chamber is changed.

The invention involves the use of a chamber whose chamber wall has an area which remains largely constant when the volume of the chamber changes. A third wall element is part of the chamber wall and extends before and after a volume change with the same contact points from the first wall element to the second wall element without areas being added to or removed from the third wall element. The mass of the third wall element thus remains constant. Thus, no sliding seal is required to cause a change in the area of the chamber wall when the volume of the chamber changes. To change the volume of the chamber, an incompressible fluid, such as a hydraulic oil or glycol, is introduced into or removed from the chamber via the passage opening. The amount of incompressible fluid in the chamber defines the volume of the chamber. The surface area of the incompressible fluid in the chamber remains largely constant as the amount of incompressible fluid in the chamber and thus the volume of incompressible fluid changes. The surface area of the incompressible fluid in the chamber corresponds to the surface area of the chamber wall. Further, a change in volume of the chamber causes the distance between the first wall element, which can be connected to the vehicle, and the second wall element, which can be connected to a spring element for a vehicle, for example a vehicle spring, to change. An increase in volume of the chamber thereby causes an increase in the distance, while a decrease in volume of the chamber causes a decrease in the distance. The incompressible fluid in the chamber ensures that a change in volume of the chamber is not caused by external forces that occur in vehicles. The first wall element and the second wall element can further be arranged, for example, opposite each other, i.e. positioned on two opposite sides of the chamber. In this way, the position of a base of a spring element of a vehicle can be changed to change the vehicle level. Since no sliding seal is required, the device is simple in design and inexpensive. Further, the use of the incompressible fluid provides a high control speed for vehicle dynamics control, since the incompressible fluid can be directed into or out of the chamber at a high speed.

A connection to the vehicle chassis can also be made via a wheel suspension. This means that the device can be arranged between the spring element and the vehicle chassis or between the spring element and a wheel suspension.

According to an example, the chamber wall may comprise the first wall element and the second wall element.

The first wall element and the second wall element can thus also be part of the chamber wall. Furthermore, this simplifies the manufacture of the chamber so that costs can be saved.

In another example, the third wall element comprises at least one formable wall element that is flexible and tensile stiff and extends between the first wall element and the second wall element.

The ductile wall element can be used to easily provide a chamber wall whose surface area remains constant when the volume of the chamber is changed as the amount of incompressible fluid in the chamber is changed. Thus, the chamber wall has a wall element that, in combination with the incompressible fluid in the chamber, is rigid in the main direction of action of the chamber between the first wall element and the second wall element, but is compliant against displacements or tilts of the first wall element and the second wall element with respect to each other. This allows forces outside the main load direction, force directions and force distributions between the vehicle chassis and the spring element to be compensated.

According to another example, the third wall element can be connected to the first wall element and the second wall element in each case by means of a sealing element.

For example, the chamber can be manufactured of several wall elements that are connected to each other by means of sealing elements. This provides a chamber that is easy to manufacture and has sufficient tightness.

Further, the at least one third wall element may comprise, for example, a fluid-tight fabric or a fabric- and/or fiber-reinforced membrane, preferably a reinforced elastomeric membrane.

The third wall element can be bellows-shaped, for example as a bellows. This provides a low-cost formable wall element.

According to another example, the chamber may comprise two formable wall elements arranged opposite each other.

The chamber can be defined, for example, by means of the first and second wall elements and the two formable wall elements arranged opposite each other. In this way, for example, a toroidal chamber can be provided which has an opening in the center through which, for example, a shock absorber element can be guided. In this case, the first wall element and the second wall element can be annular, for example. The shock absorber element can then be arranged through the openings of the rings of the first wall element and the second wall element. In this way, a device having a toroidal chamber with annular first and second wall elements can be provided, which can be arranged around a shock absorber.

Further, the third wall element may comprise, for example, at least two wall sections, wherein the at least two wall sections are connected to each other by means of a sealing element.

For example, one wall section may be connected to the first wall element and the other wall section may be connected to the second wall element. In this way, a chamber can be provided which has several sub-chambers defined by the individual wall sections. In this way, for example, greater overall heights can be provided for the device by means of standard parts for the deformable wall elements in order to cost saving.

In another example, the passage opening may be closable. Therefore, the amount of incompressible fluid in the chamber can be changed only when the passage opening is opened. After adjusting the amount of incompressible fluid in the chamber, the passage opening can be closed so that an incompressible fluid input/output device is in operation only when a change in the amount of incompressible fluid in the chamber is to be effected.

According to another example, the first wall element and the second wall element may be formed as plates connected to the chamber.

The plates can, for example, be stop plates with which the first wall element or the second wall element can be connected to the vehicle chassis or the spring element by means of fasteners. This facilitates the connection to the vehicle chassis or to the spring element, so that installation and maintenance costs can be reduced.

According to another example, the device may have an axial guide that guides the first wall element and the second wall element in the axial direction of the spring element. The axial guide avoids a radial offset of the first and second wall elements relative to each other. It can have a centering element and a guide element. The centering element can be connected to the first wall element or the second wall element. The guide element is then connected to the respective other wall element. With the axial guide, radial forces resulting from the spring element are transmitted to the entire device. The radial forces therefore act not only on the second wall element, which would transmit these forces as radial shear forces to the third wall element. The axial guidance therefore protects the third wall element and increases its service life.

The axial guide can be arranged inside the chamber. In this case, the centering element can be a centering spigot and the guide element can be a guide spigot. Further, the axial guide can have a duct that is connected to the passage opening in a fluid-communicating manner. The centering element or the guide element can then have a further passage opening that is connected to the line in fluid-communicating fashion.

The axial guide can be arranged inside the chamber. The centering element can be a centering spigot and the guide element can be a guide spigot. Furthermore, the axial guide may have a conduit that is fluidly communicating with the passage opening in fluid communication.

The centering element or the guide element can then have a further opening which is connected to the conduit in a fluid-communicating manner.

In another example, the device may include at least two axial guides.

For example, the device can have a separate component that is connected to the second wall element and can have a receptacle geometry for the spring element. For connection to the second wall element, the separate component can have a receptacle geometry for the second wall element.

Furthermore, the axial guide can be arranged outside the chamber. The axial guide can connect the first wall element with the second wall element or the separate component.

In another example, the separate component may include an outer guide for the third wall element. The outer guide can guide at least a part of the third wall element and avoids a radial displacement of the third wall element or its inflation. This increases the service life of the third wall element, especially if the third wall element is designed as a bellows. Thinner and more flexible designs of the third wall element are also possible. The third wall element can thus be made more cost-effective and sometimes also offer greater comfort, as it rolls more easily due to a thinner wall thickness, for example.

Further, the invention relates to a system for springing a vehicle, the system comprising a spring element, a device according to the preceding description, and an incompressible fluid input/output device, wherein the second wall element is connected to an end portion of the spring element and the passage opening is fluidly communicating with the incompressible fluid input/output device.

Advantages and effects as well as further developments of the system result from the advantages and effects as well as further developments of the device described above. Reference is therefore made in this respect to the preceding description.

According to one example, the system further comprises a shock absorber element, wherein the spring element and the device are arranged around at least a portion of the shock absorber element.

This provides a component set comprising a shock absorber element, a spring element, and a device for adjusting a foot point of a spring element for a vehicle, which is simple in structure, inexpensive, and has a high control speed for vehicle dynamics control.

Further, the invention relates to a method for adjusting a foot point of a spring element for a vehicle by means of a device or a system according to the preceding description, the vehicle having a vehicle chassis and a wheel suspension swivel-mounted on the vehicle chassis and having a spring element and a sensor for determining an angle between the vehicle chassis and the wheel suspension, the system or the system and the spring element being disposed between the vehicle chassis and the wheel suspension, the method comprising the following step: determining an actual angle between the vehicle chassis and the suspension by means of the sensor; determining a desired angle between the vehicle chassis and the suspension; and changing the volume of the chamber by means of a change in an amount of incompressible fluid in the chamber to adjust the base of the spring element, the chamber having a chamber wall with at least one third wall element extending from the first wall element to the second wall element, the mass of which remains constant when the volume of the chamber is changed.

The invention thus further provides a fast control method to provide vehicle dynamics control. After determining the actual angle between the vehicle chassis and the wheel suspension by means of the sensor and determining a target angle, the volume of the chamber can be changed very quickly by means of the incompressible fluid. This means that the foot point of the spring element can be adjusted very quickly so that the target angle between the wheel suspension and the vehicle chassis is produced. It can also be used to compensate for changes in the actual angle while the vehicle is moving.

Further advantages and effects as well as further developments of the method result from the advantages and effects as well as further developments of the device described above. Reference is therefore made in this respect to the preceding description.

BRIEF DESCRIPTION OF THE DRAWINGS

Further features, details and advantages of the invention are apparent from the wording of the claims and from the following description of embodiments based on the drawings.

DETAILED DESCRIPTION

Figure 1:
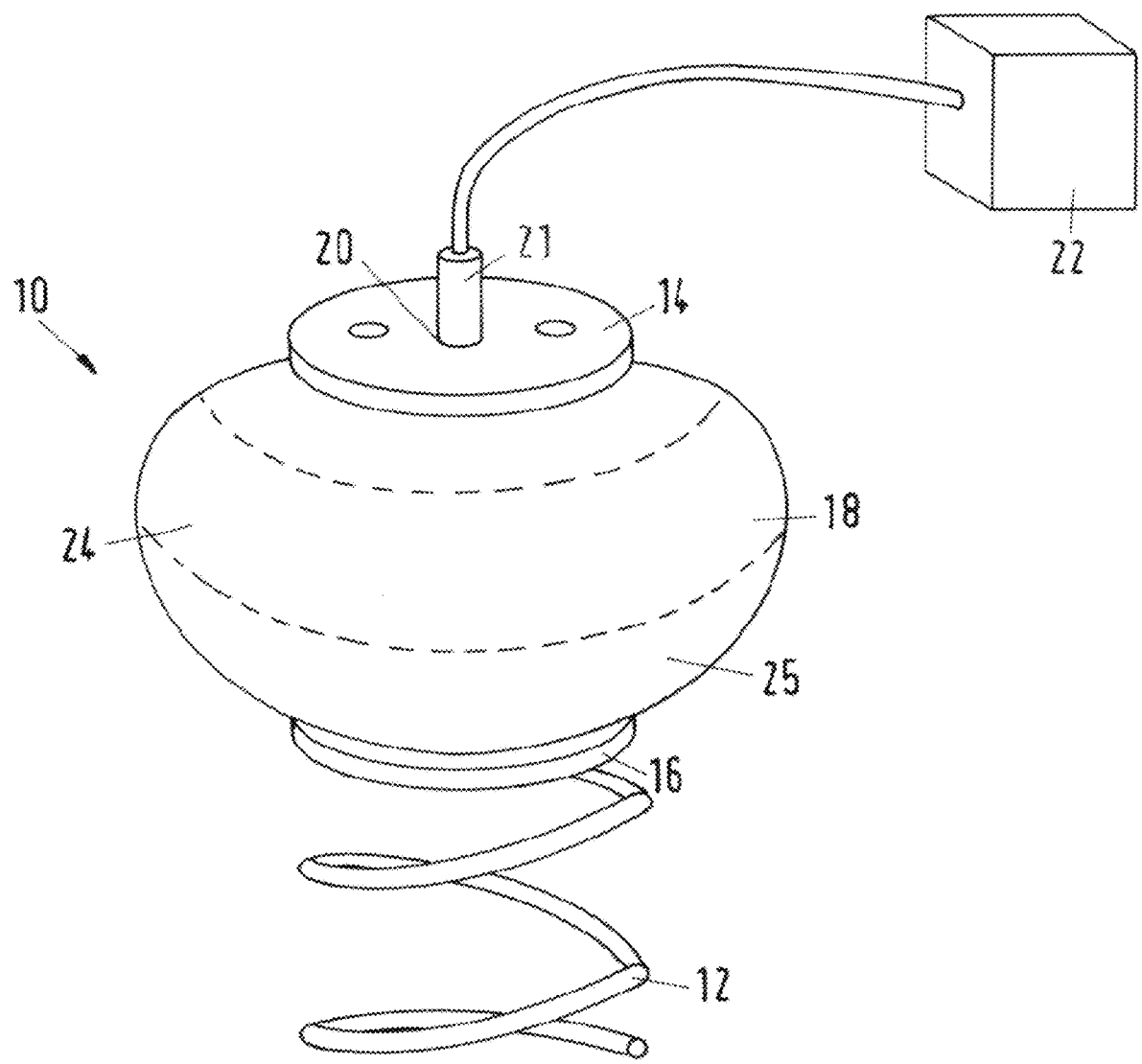
FIG. 1 generally illustrates a schematic representation of a device for adjusting a foot point of a spring element for a vehicle.

In the following, the device for adjusting a foot point of a spring element for a vehicle is referred to by the reference sign 10.

The device 10 includes a first wall element 14 for connecting to a vehicle and a second wall element 16 for connecting to a spring element 12. The first wall element 14 and the second wall element 16 are arranged at a distance from each other. A chamber 18 for changing the distance between the first wall element 14 and the second wall element 16 is disposed between the first wall element 14 and the second wall element 16. The chamber 18 is connected to the first wall element 14 and the second wall element 16. In this regard, the chamber 18 may include the first wall element 14 and the second wall element 16, such that the first wall element 14 and the second wall element 16 may be part of the chamber 18.

Further, the chamber 18 has an incompressible fluid 27. That is, the chamber 18 is filled with the incompressible fluid 27. The first wall element 14 and/or the second wall element 16 further comprise a passage opening 20 for the incompressible fluid 27, through which the incompressible fluid 27 can be filled into or removed from the chamber 18. The passage opening 20 is thus in fluid communication with the chamber 18. Further, the passageway opening 20 is adapted to be connected to an input/output device 22 for the incompressible fluid 27. For this purpose, a valve 21 may be arranged at the passage opening 20.

The incompressible fluid 27 may be, for example, glycol, a glycol-water mixture, brake fluid, or hydraulic steering oil.

Changing a dimension of the chamber 18 between the first wall element 14 and the second wall element 16 causes a change in the distance between the first wall element 14 and the second wall element 16. The distance between the first wall element 14 and the second wall element 16 can be changed using the chamber 18 by introducing additional incompressible fluid 27 into the chamber 18 or removing incompressible fluid 27 from the chamber 18. Changing the amount of incompressible fluid 27 in the chamber 18 changes the volume of the chamber 18.

Figure 2A:
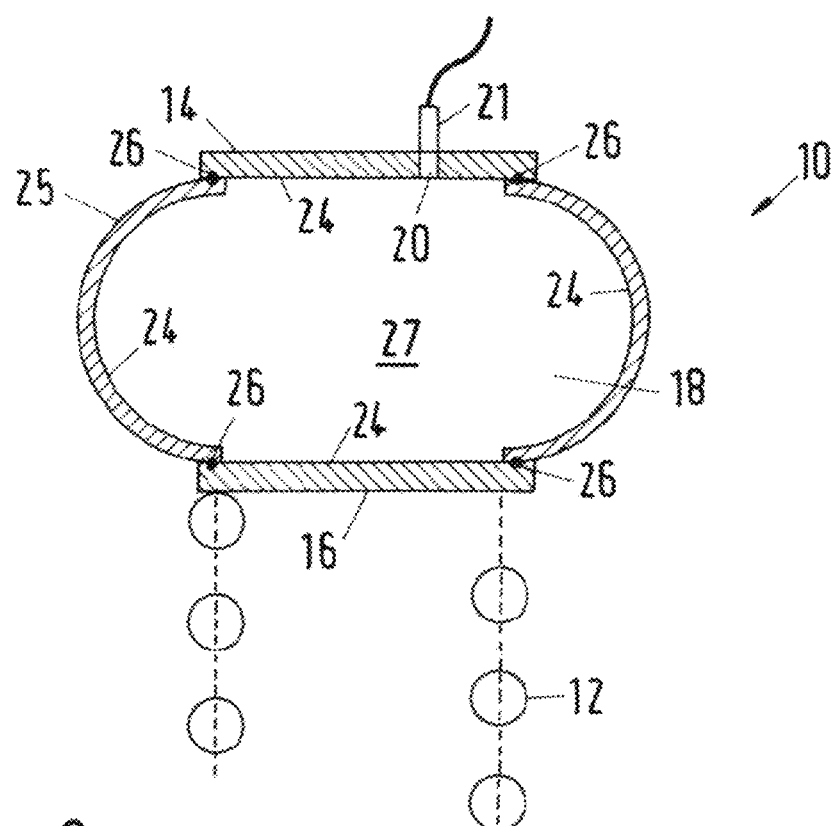
FIGS. 2a and 2b generally illustrate schematic sectional views of the device with different volumes in the chamber.
Figure 2B:
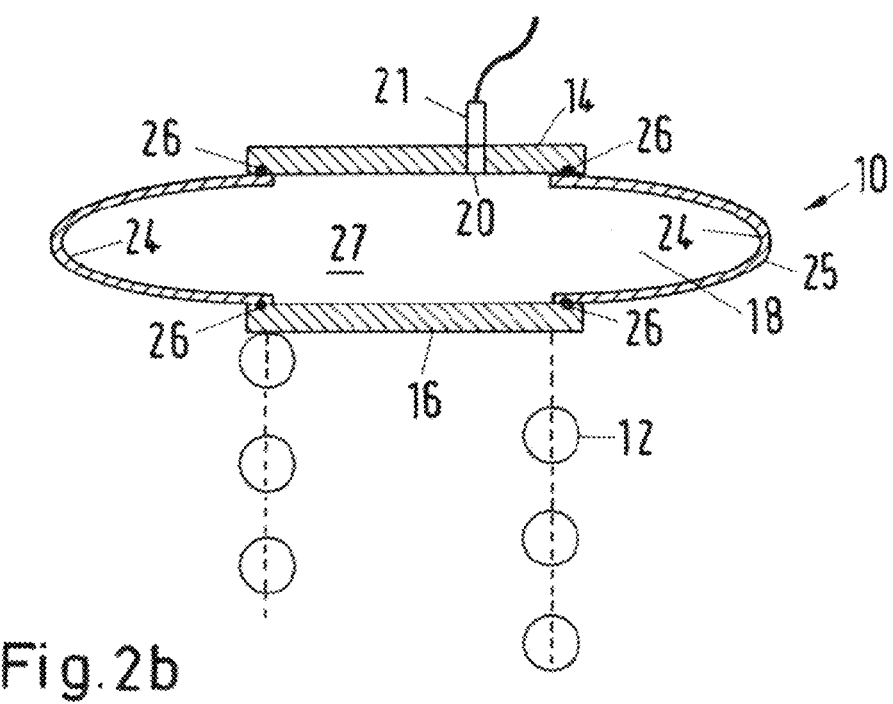

FIGS. 2a and 2b show different states of the chamber 18 and the device 10, respectively. In FIG. 2a, the chamber 18 has a first volume, while in FIG. 2b the chamber 18 has a second volume that is smaller than the first volume. In FIGS. 2a and 2b, the chamber 18 thus has a different volume of incompressible fluid 27 in each case.

Further, the chamber 18 has a chamber wall 24 defining the chamber 18. The chamber wall 24 has at least one third wall element 25 extending from the first wall element 14 to the second wall element 16. The third wall element 25 extends from the first wall element 14 to the second wall element 16 independently of the volume of the chamber 18. The mass of the third wall element 25 is therefore constant. That is, a change in the volume of the chamber 18 does not cause a substantial change in the surface area of the chamber wall 24. Further, to change the volume of the chamber 18, no wall element is added to or removed from the chamber wall 24 that newly comes into contact with or loses contact with the volume of the chamber 18, such as when a ram of a hydraulic chamber is pulled out or pushed in. This is also evident from FIGS. 2a and 2b, in which, despite the different volumes, the third wall element 25 has the same mass and in both cases extends from the first wall element 14 to the second wall element 16.

To this end, the third wall member 25 may include a formable wall element that is flexurally soft and tensile stiff. The formable wall element extends between the first wall element 14 and the second wall element 16. The ductile wall element forms a bellows that extends between the first wall element 14 and the second wall element 16. In each of the following embodiments, the third wall member 25 may include a formable wall member.

In this embodiment, the third wall element 25 has a C-shaped cross-section and extends in a ring around a central axis (not shown). The first wall element 14 and the second wall element 16 close the openings of the ring formed by the third wall element 25. This defines chamber 18. The connection between the third wall element 25 and the first and second wall elements 16 can be made by means of a sealing element 26.

In a first embodiment, the third wall element 25 may be a fluid-tight fabric. The fluid-tight fabric thereby encloses the incompressible fluid 27 disposed in the chamber 18. The incompressible fluid 27 in the chamber 18 stabilizes the shape of the fluid-tight fabric, so that a distance between the first wall element 14 and in the second wall element 16 also remains constant while the volume of the chamber 18 remains constant.

In another embodiment, the third wall element 25 may be a fabric and/or fiber reinforced membrane. For example, this may be a reinforced elastomeric membrane. When the reinforced elastomeric membrane is arranged between a spring element 12 and a vehicle chassis 44 or wheel suspension 46, a force acts on the elastomeric membrane, pressing the first wall element and the second wall element 16 towards each other. As a result, the elastomeric diaphragm is formed (see FIG. 2b) without significantly changing an area of the elastomeric diaphragm. By introducing incompressible fluid 27, the volume of the chamber 18 is increased and the reinforced elastomeric membrane is also deformed, while the total area of the reinforced elastomeric membrane remains constant. Further, a reinforced elastomeric membrane is simple and inexpensive to manufacture.

Figure 3:
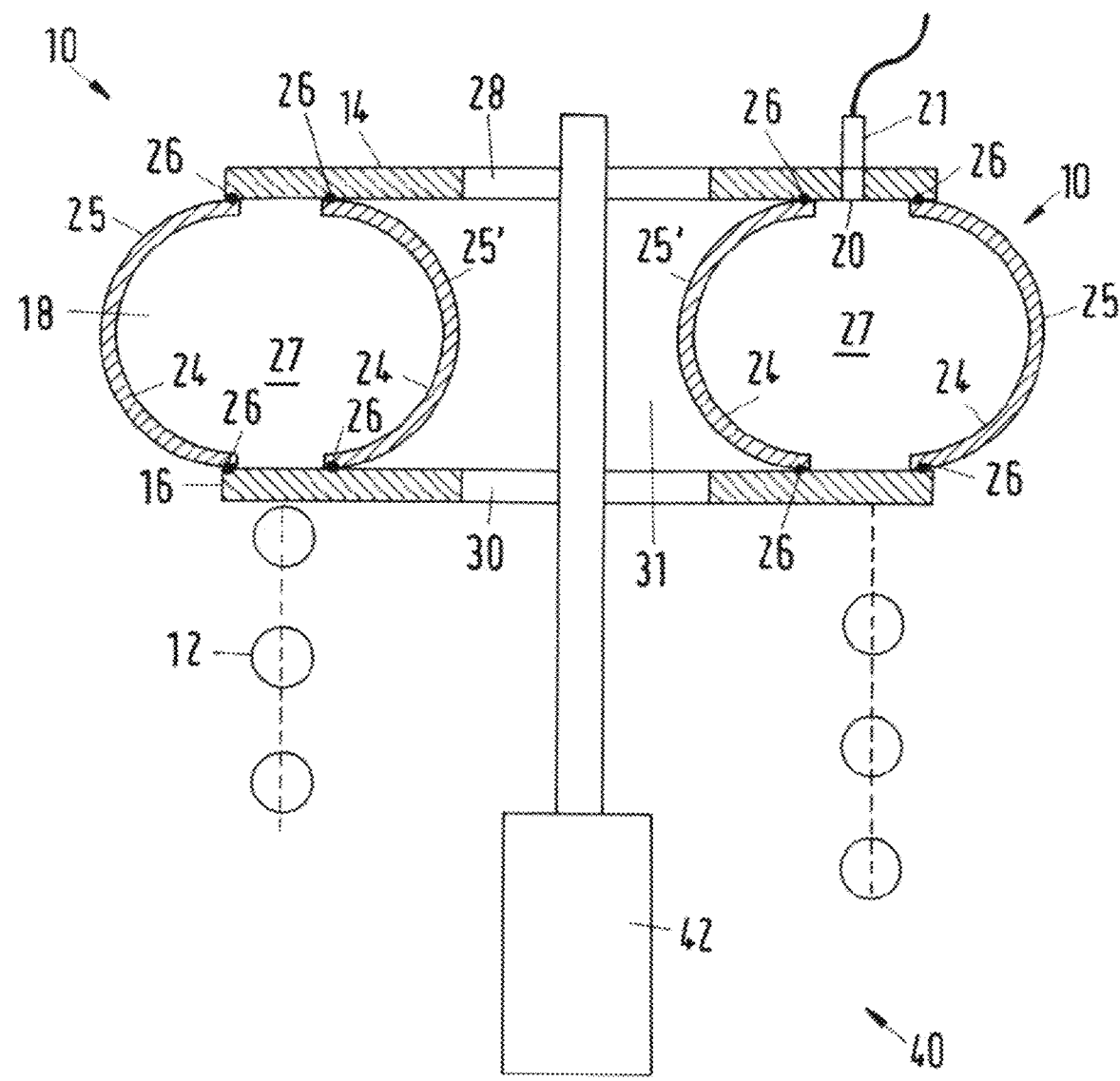
FIG. 3 generally illustrates a schematic representation of an embodiment of the device.

FIG. 3 shows another embodiment of the device 10, in which the device 10 comprises a toroidal chamber 18. The third wall element 25 may have two formable wall elements arranged opposite each other. One of the two formable wall elements extends along the outer radius of the torus. The other of the two formable wall elements 25' extends along the inner radius of the torus.

Both formable wall elements are each connected to the first wall element 14 and the second wall element 16 by sealing elements 26.

Furthermore, the first wall element 14 and the second wall element 16 can be ring-shaped. The openings 28, 30 of the rings are thereby arranged on the opening 31 of the torus. A shock absorber element 42 can be guided through these openings 28, 30, 31, so that the device 10 can be arranged around a shock absorber element 42. Likewise, a spring element 12 can be arranged therewith around the shock absorber element 42. The spring element 12, the shock absorber element 42 and the device 10 can thereby form a system 40, which can be formed as an assembly.

Figure 4:
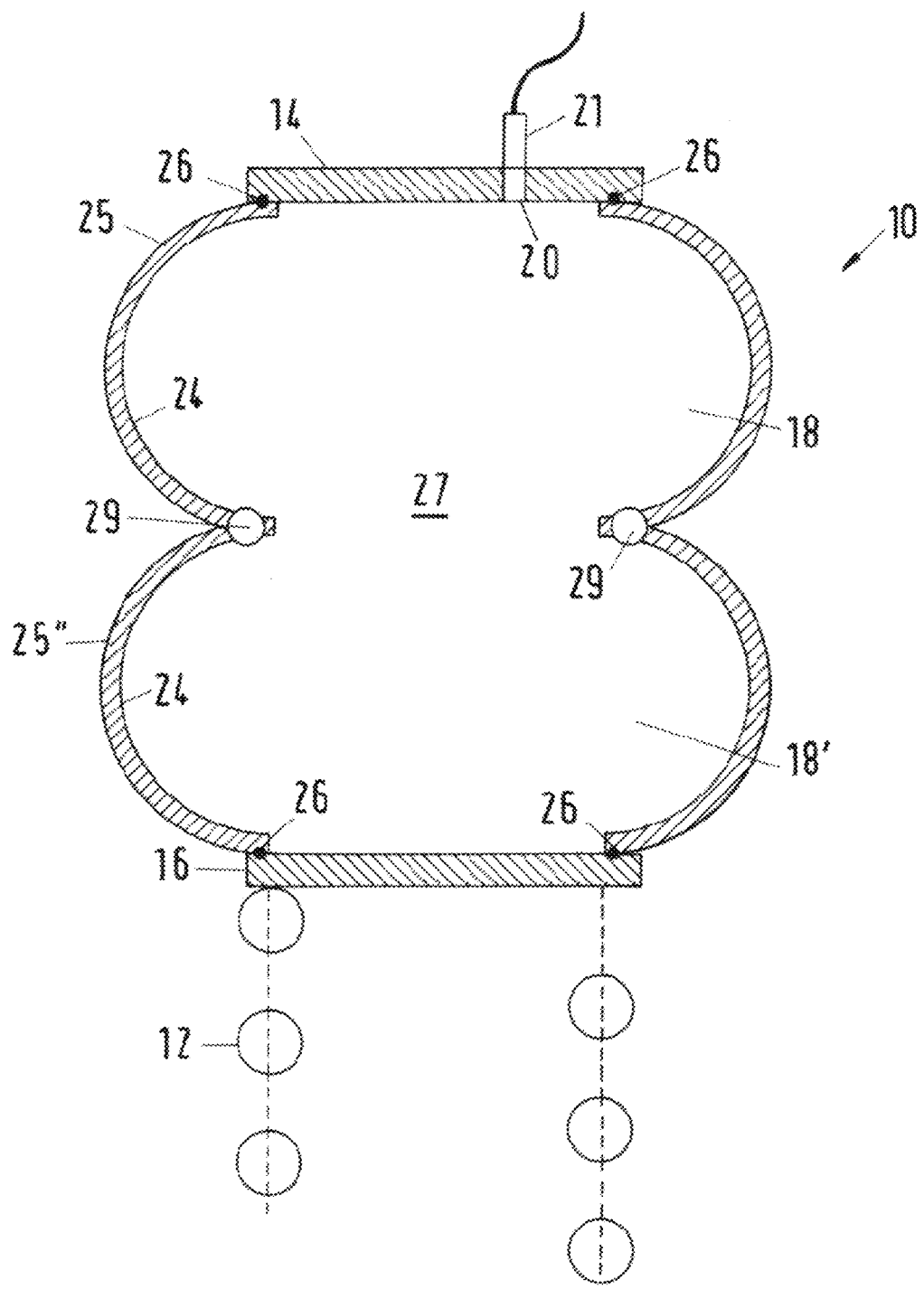
FIG. 4 generally illustrates a schematic representation of a further embodiment of the device.

FIG. 4 shows a further embodiment of the device 10. In this embodiment, the third wall element 25 has at least two wall sections which are connected to one another by means of a sealing element 29 and can be formable wall elements. In this case, one wall section is connected to the first wall element 14 via a sealing element 26. The wall section 25" is connected to the second wall element 16 via a sealing element 26. The two wall sections define two subchambers 18, 18' of the chamber 18. In this way, the maximum distance between the first wall element 14 and the second wall element 16 can be increased without great effort and without the construction of new components by means of the already known components for the third wall element 25.

The number of wall sections can also be selected to be greater than two in order to further increase the maximum distance between the first wall element 14 and the second wall element 16.

Figure 5:
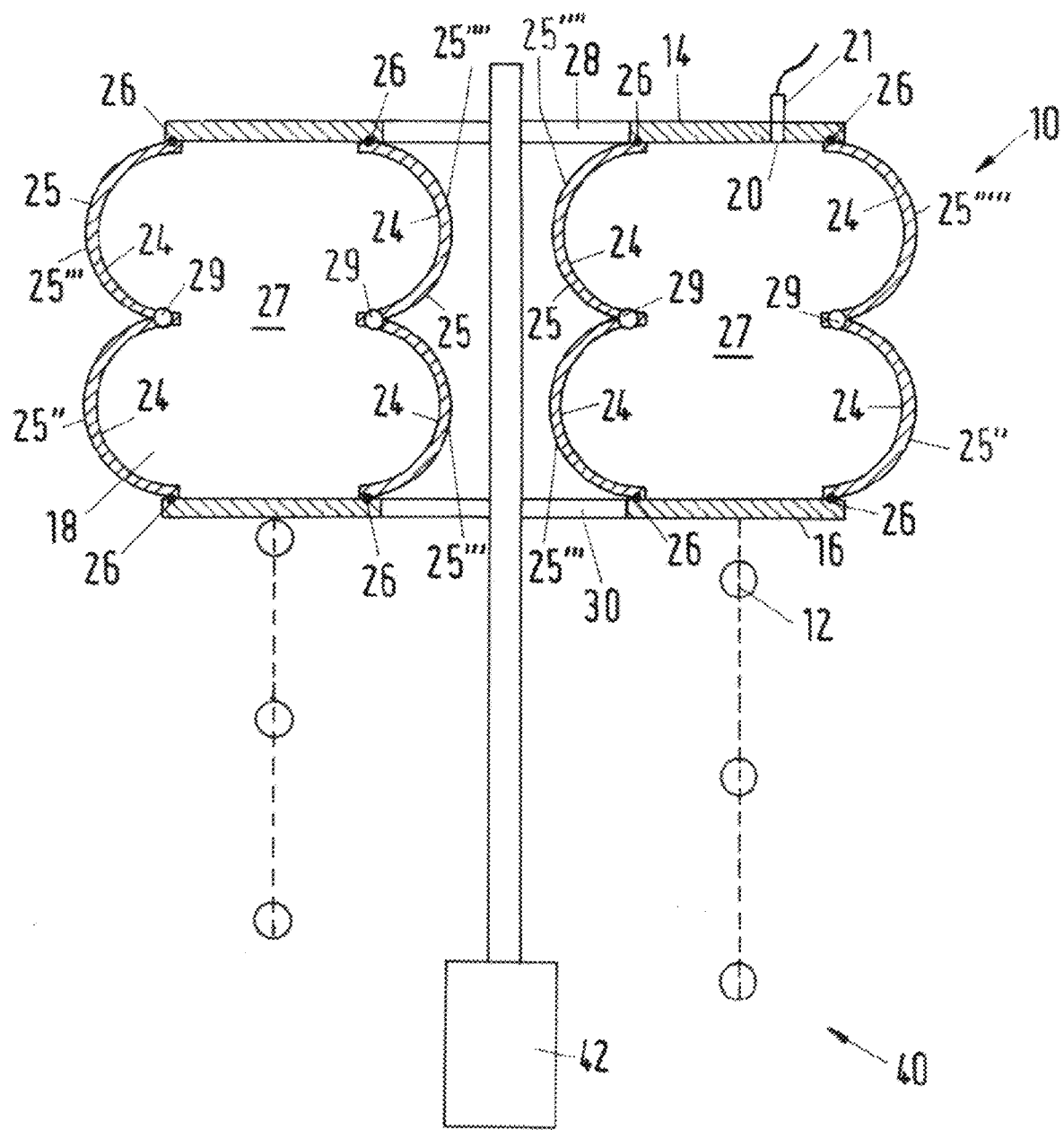
FIG. 5 generally illustrates a schematic representation of a second further embodiment of the device.

FIG. 5 shows an exemplary combination of the embodiments in FIG. 3 and FIG. 4, in which the chamber 18 is toroidal in shape and has two opposing third wall elements 25. Both third wall elements 25, in this example, each have two wall sections which are connected to each other by means of a sealing element 29. In each case, one of the two wall sections 25''', 25'''' of a third wall element 25 is connected to the first wall element 14 via a sealing element 26. The other of the two wall sections 25'', 25''' of a third wall element 25 is connected in each case to the second wall element 16 via a sealing element 26.

Figure 6A:
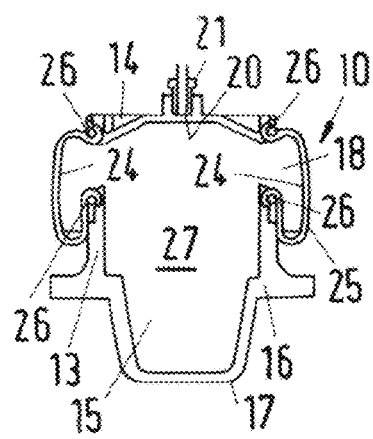
FIGS. 6a-6e generally illustrate schematic representations of the device in various embodiments.
Figure 6B:
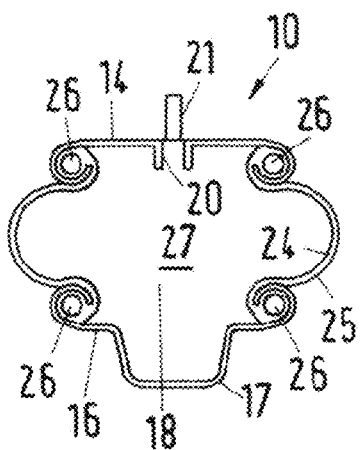
Figure 6C:
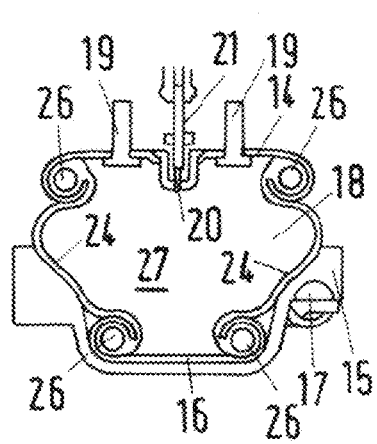

FIGS. 6a to 6c show various embodiments of the chamber 18 and the first and second wall elements 16.

FIG. 6a shows a chamber 18 with a formable wall section that is suspended over a flange of the second wall element 16. The second wall element 16 is U-shaped and has a receiving geometry 17 for a spring element 12. Thereby, a major part of the chamber 18 is formed by a volume enclosed by a flange 13 of the second wall element 16. As the amount of incompressible fluid 27 in the chamber 18 is increased, the third wall member 25 is stretched between the first wall member 14 and the second wall member 16 until the suspended portion of the third wall member 25 has lifted above the second wall member 16. Since the third wall element 25 is not designed to be stretchable, the maximum distance between the first wall element 14 and the second wall element 16 is thus reached.

FIG. 6b shows another exemplary embodiment of the device 10, in which the second wall element 16 is formed from a plate in which a receiving geometry 17 for the spring element 12 is formed.

FIG. 6c shows a further exemplary embodiment of the device 10, in which a receiving geometry 17 for the spring element 12 is provided by a separate component 15, which additionally has a receiving geometry for the second wall element 16 and a part of the third wall element 25. Furthermore, fastening means 19 are shown on the first wall element 14 in this illustration, with which the first wall element 14 can be fastened to a vehicle chassis 44 or a wheel suspension 46.

Figure 6D:
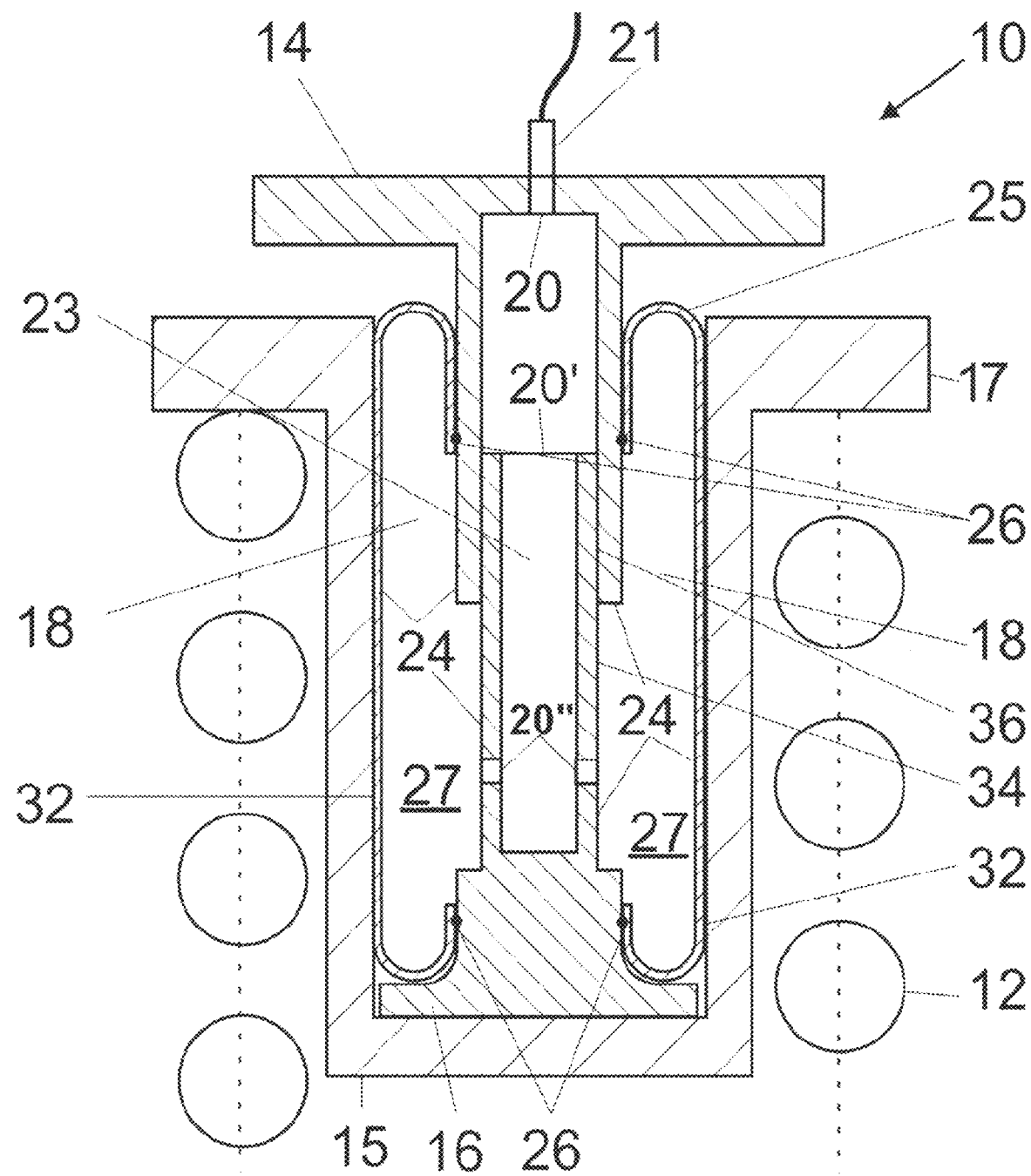

FIG. 6d shows another exemplary embodiment of the device 10. In this example, the separate component 15 has an outer guide 32 for the third wall element 25, which extends over the spring element 12. Thus, the outer guide 32 has a higher supporting effect than in the embodiment according to FIG. 6c.

Further, this example has an axial guide comprising a centering element 34 and a guide element 36. The guide element 36 is designed to guide the centering element 34 in the axial direction of the spring element 12. For this purpose, the centering element 34 can be connected to the guide element 36 in a sliding manner. Further, the centering element 34 may be connected to the first or second wall element 14, 16. The guide element 36 is then connected to the respective other wall element 14, 16. In this example, the axial guide is arranged in the chamber 18. The third wall element 25 extends around the axial guide.

The centering element 34 and the guide element 36 may further form a duct 23 for the incompressible fluid 27, which is fluidly connected to the valve 21. In this example, the valve 21 is arranged on the first wall element 14 and connected to the duct 23 via a passage opening 20. The duct 23 has further passage openings 20' and 20" at the centering element 34, through which the incompressible fluid 27 can flow into the chamber 18.

In this example, the centering element 34 can be a centering spigot. Furthermore, the guiding element 36 can be a guiding nozzle.

Figure 6E:
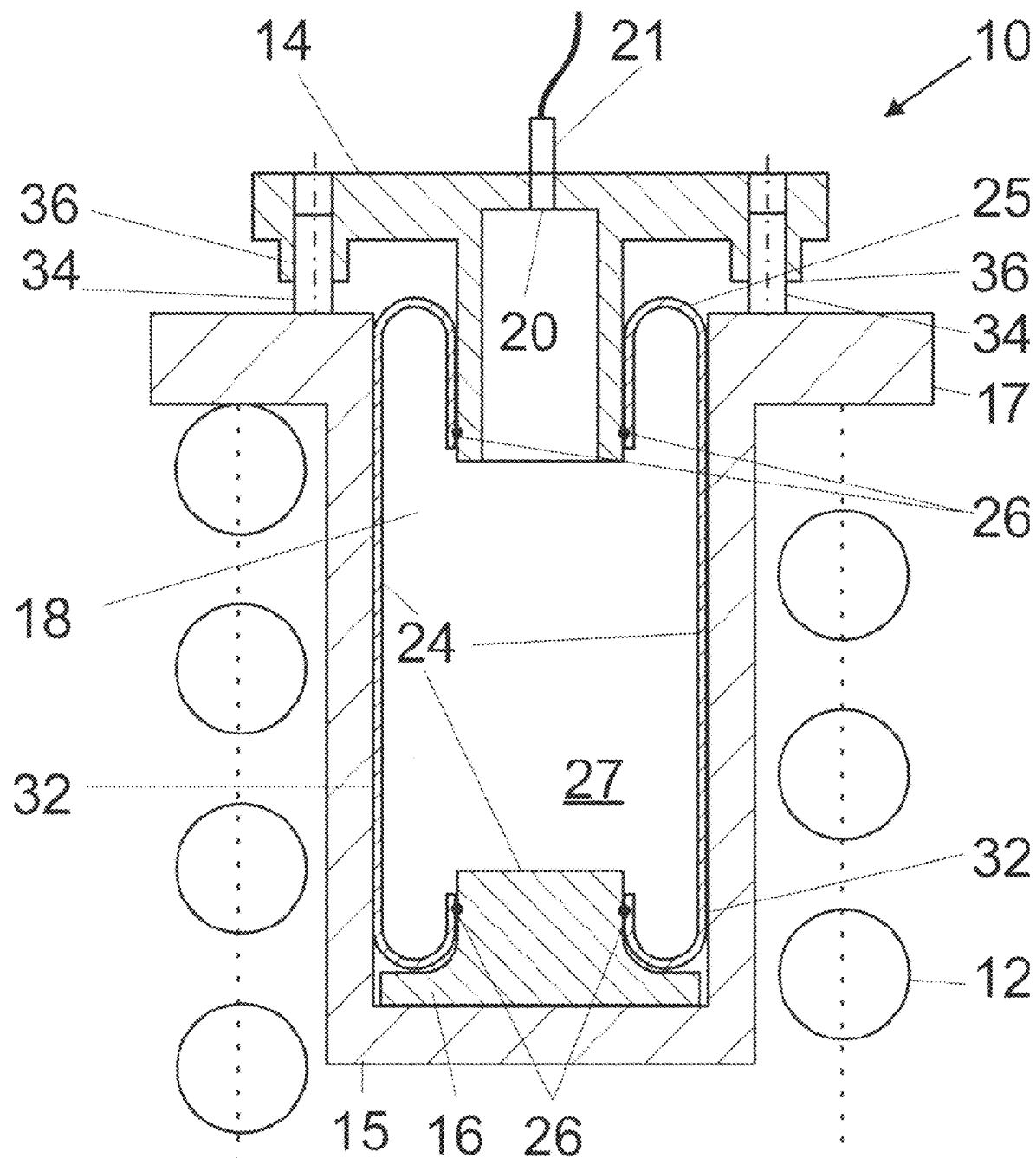

FIG. 6e shows another example of the device 10. This example may also have the separate element 15. Unlike the example shown in FIG. 6d, the device has at least two axial guides. For this purpose, the first wall element 14 is connected to the second wall element 16 or the separate element 15 via the axial guides outside the chamber 18. The third wall element 25 does not extend around the axial guide in this example.

Also in this example, the centering element 34 can be connected to the first wall element 14 or the second wall element 16 or the separate component 15. The guide element 36 is then connected to the respective other wall element 14, 16 or the separate component.

It should be noted that the axial guide with the centering element 34 and the guide element 36 can be combined with any of the above examples. Further, the axial guide can be used independently of the outer guide 32.

Figure 7:
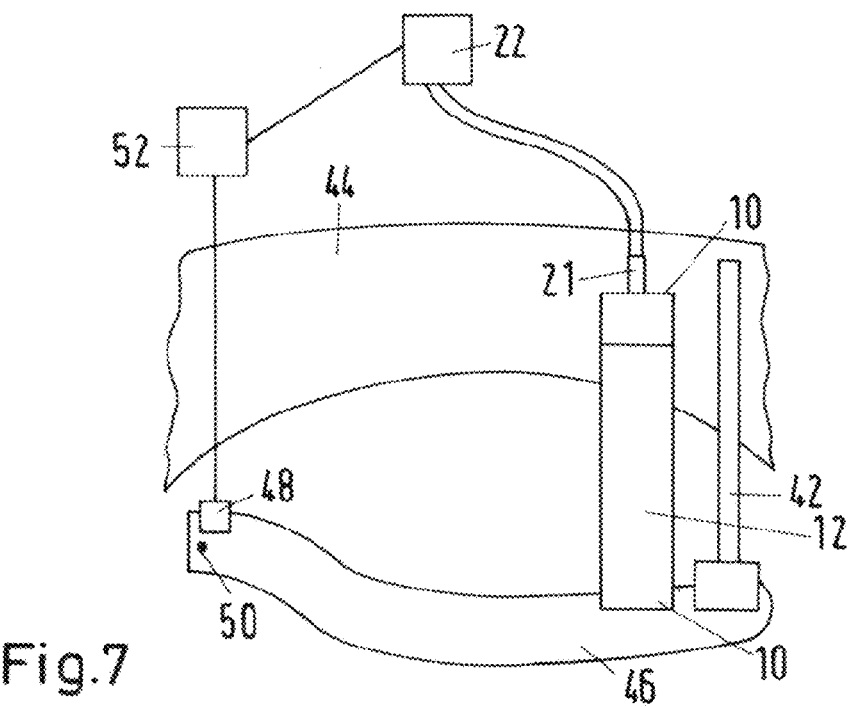
FIG. 7 generally illustrates a schematic representation of the system.

FIG. 7 shows a system 40 comprising a spring element 12, a shock absorber element 42 and a device 10 for adjusting a foot point of a spring element 12 of a vehicle. Further shown are a portion of a vehicle body 44 and a wheel suspension 46 having a sensor 48, such as a rotation angle sensor. The wheel suspension 46 is swivel-mounted to the vehicle body 44 via an axle 50. The sensor 48 measures the angle between the wheel suspension 46 and the vehicle body 44 at the axle 50. Further, a control unit 52 can receive signals from the sensor 48 to determine the angle between the wheel suspension 46 and the vehicle body 44.

The spring element 12 and the shock absorber element 42 are arranged between the vehicle chassis 44 and the wheel suspension 46. The device 10 is arranged between the vehicle chassis 44 and the spring element 12 and/or between the spring element 12 and the wheel suspension 46. By means of the device 10, the distance between the wheel suspension 46 and the vehicle chassis 44 can be changed when the spring element 12 is compressed. This also changes the angle between the wheel suspension 46 and the vehicle chassis 44.

The change in distance by means of the device 10 is effected by introducing or discharging incompressible fluid 27 into the device 10. For this purpose, an input/output device 22 is provided which can input or output the incompressible fluid 27 into the chamber 18 of the device 10. The input/output device 22 may be, for example, a pump for the incompressible fluid. Further, the input/output device 22 is connected to the control unit 52 such that the control unit 52 can transmit control signals to the input/output device 22.

Figure 8:
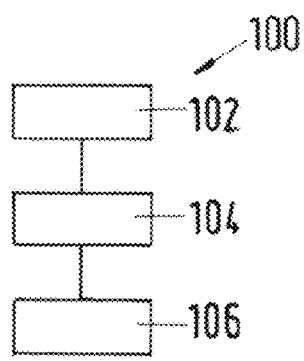
FIG. 8 generally illustrates a flowchart of the method for adjusting a foot point of a spring element for a vehicle.

In this regard, the control unit 52 may use the method 100 to adjust a foot point of a suspension element 12 for a vehicle. According to the method 100, as shown in FIG. 8, in a first step 102, an actual angle between the vehicle chassis 44 lower suspension is determined by means of the sensor 48. Further, in a second step 104, the control unit 52 determines a desired angle between the vehicle chassis 44 and the wheel suspension 46. To adjust the actual angle to the desired angle, the control unit 52 transmits control signals to the input/output device 22 to change the volume of the chamber 18 in a step 106 by changing an amount of incompressible fluid 27 in the chamber 18. In this step, the base of the spring element 12 is adjusted, the chamber 18 having a chamber wall 24 with at least one third wall element 25 extending from the first wall element 14 to the second wall element 16, the mass of which remains constant when the volume of the chamber 18 is changed.

The invention is not limited to any of the above-described embodiments, but can be modified in a variety of ways.

All features and advantages resulting from the claims, the description and the drawing, including constructional details, spatial arrangements and process steps, can be useful for the invention both individually and in the most diverse combinations.

The invention claimed is:

1. A device for adjusting a foot point of a spring element for a vehicle, the device comprising:
 a first wall element configured for connection to a vehicle,
 a second wall element spaced from the first wall element and configured for connection to the spring element, and
 a chamber disposed between the first wall element and the second wall element and configured for changing the distance between the first wall element and the second wall element by changing a volume of the chamber,
 wherein the chamber comprises an incompressible fluid and the first and/or second wall element comprises a passage opening for the incompressible fluid to the chamber, the passage opening being fluidly communicably connectable to an input/output device for the incompressible fluid for changing the volume of the chamber;
 wherein the chamber has a chamber wall with at least one third wall element extending from the first wall element to the second wall element, the mass of the third wall element being constant when the volume of the chamber is changed;
 wherein the device has an axial guide element arranged inside the chamber, the axial guide element including a centering element and a guide element;
 wherein the guide element is configured to guide the centering element in the axial direction of the spring element, the centering element is connected to the guide element in a sliding manner;
 wherein the centering element is connected to the first wall element or the second wall element and the guide element is connected to the respective other wall element;
 wherein the third wall element extends around the axial guide; and
 wherein the device has a separate element having a receiving geometry for the spring element, an additional receiving geometry for the second wall element and a part of the third wall element and an outer guide for the third wall element, which extends over the spring element.

2. The device according to claim 1, wherein the chamber wall comprises the first wall element and the second wall element.

3. The device according to claim 1, wherein the third wall element comprises at least one formable wall element which is flexible and stiff in tension and extends between the first wall element and the second wall element.

4. The device according to claim 1, wherein the third wall element is connected to the first wall element and the second wall element in each case by a sealing element.

5. The device according to claim 1, wherein the at least one third wall element comprises a fluid-tight fabric.

6. The device according to claim 1, wherein the third wall element has two deformable wall elements arranged opposite one another.

7. The device according to claim 1, wherein the third wall element has at least two wall sections, wherein the at least two wall sections are connected to one another by a sealing element.

8. The device according to claim 1, wherein the chamber is toroidal in shape.

9. The device according to claim 8, wherein the first wall element and the second wall element are ring-shaped.

10. The device according to claim 1, wherein the passage opening can be closed.

11. The device according to claim 1, wherein the first wall element and the second wall element are formed as plates connected to the chamber.

12. A system for springing a vehicle, the system comprising a spring element, a device according to claim 1, and an input/output device for the incompressible fluid, wherein the second wall element is connected to an end portion of the spring element and the passage opening is fluidly connected with the input/output device for the incompressible fluid.

13. The system according to claim 12, wherein the system further comprises a shock absorber element, and wherein the spring element and the device are arranged around at least a partial portion of the shock absorber element.

14. A method of adjusting a foot point of a spring element for a vehicle by a device according to claim 1, the vehicle having a vehicle body and a wheel suspension swivel-mounted on the vehicle body and having a spring element and a sensor for detecting an angle between the vehicle body and the wheel suspension, the system and the spring element being disposed between the vehicle body and the wheel suspension, the method comprising:
- determining an actual angle between the vehicle chassis and the wheel suspension by the sensor;
- determining a desired angle between the vehicle body and the wheel suspension; and
- changing the volume of the chamber by changing an amount of incompressible fluid in the chamber to adjust the base of the spring element.

15. The device according to claim 1, wherein the at least one third wall element comprises a fabric-and/or fiber-reinforced membrane.

16. The device according to claim 1, wherein the at least one third wall element comprises a reinforced elastomeric membrane.

* * * * *